Nov. 5, 1968  E. L. KELSEY  3,409,828
APPARATUS FOR TESTING ELECTRICAL CIRCUIT BOARDS
Filed Oct. 30, 1964  3 Sheets-Sheet 1

INVENTOR.
E. L. KELSEY
BY *Young & Quigg*
ATTORNEYS

Nov. 5, 1968   E. L. KELSEY   3,409,828
APPARATUS FOR TESTING ELECTRICAL CIRCUIT BOARDS
Filed Oct. 30, 1964   3 Sheets-Sheet 2

INVENTOR.
E. L. KELSEY
BY Young & Quigg
ATTORNEYS

INVENTOR.
E. L. KELSEY
BY
ATTORNEYS

United States Patent Office 3,409,828
Patented Nov. 5, 1968

3,409,828
APPARATUS FOR TESTING ELECTRICAL CIRCUIT BOARDS
Edward L. Kelsey, Bartlesville, Okla., assignor to Phillips Petroleum Company, a corporation of Delaware
Filed Oct. 30, 1964, Ser. No. 407,687
1 Claim. (Cl. 324—73)

ABSTRACT OF THE DISCLOSURE

An electrical circuit board tester is provided with a plurality of terminal connectors for receving the circuit board to be tested, a plurality of power supplies connected to respective ones of said plurality of terminal connectors to provide operating voltages, a signal source connected to at least one of said terminal connectors, a timer connected between one of said power supplies and one of said terminal connectors to actuate a relay on said circuit board from a first state to a second state, and a recorder connected to at least one of said terminal connectors.

---

This invention relates to electrical circuit testing apparatus. In one aspect, this invention relates to apparatus for field testing circuits of a programmer.

Programmers are conventionally employed to control a process by, for example, controlling the operation of a chromatographic analyzer and the transmission of a signal or signals representative of the analysis results to a process recorder and/or controller. Some programmers are capable of controlling multiple analyzers. The Model 284 Matrix Programmer, a product of Perkin-Elmer Corporation of Norwalk, Conn., for example, is capable in the control of chromatographic analyzers of handling as many as 10 components and up to 6 process streams in specified combinations. A programmer such as the Model 284 contains a number of memory circuits, a memory circuit for each constituent of the process stream to be analyzed. Each of these memory circuits is mounted upon a single card or board which is so adapted as to be readily inserted into and withdrawn from the programmer.

In operation, the memory circuit receives an amplified and scaled signal pulse from a chromatographic analyzer, the amplitude of the pulse representative of the heighth of a chromatographic peak for a single constituent and the length of time the signal pulse is transmitted to the memory circuit representative of the width of the chromatographic peak. The memory circuit stores the input signal until another timed signal pulse is received and stored. The memory circuit is in communication with a recorder and/or controller and continuously transmits a signal pulse representative of the stored signal pulse to the said recorder and/or controller.

Conventionally, it has been necessary in the testing of memory circuits for possible malfunction to remove the memory circuit from the programmer and to take the memory circuit to an electrical laboratory for a series of tests. Under these circumstances, the programmer is inoperative for the considerable length of time required to remove, test, and replace the memory circuit. When the programmer is employed in the process control, it is desirable that downtime of the programmer be reduced to a minimum.

Accordingly, an object of my invention is to provide an improved electrical circuit tester.

Another object of my invention is to provide an electrical circuit tester for a programmer.

Another object of my invention is to provide a portable tester for the electrical memory circuit of a programmer.

Other objects, advantages and features of my invention will be readily apparent to those skilled in the art from the following description, drawings and appended claim.

I have by my invention provided a portable electrical circuit tester wherein cards or boards containing electrical circuits are readily connected to the portable testing apparatus, various signal pulses simulating operating conditions for the electrical circuit being tested are transmitted to the electrical circuit, and the capability of the electrical circuit to function properly is determined with a minimum loss of operating time for the electrical circuit.

The inventtion is particularly applicable, although not to be limited thereto, to the testing of memory electrical circuits placed on cards or boards and utilized in programmers employed to control the operation of process analyzers. As thus applied, the invention is particularly effective in reducing to a minimum downtime of the programmer and enables maximum utilization of the inventive testing apparatus.

Figure 1:
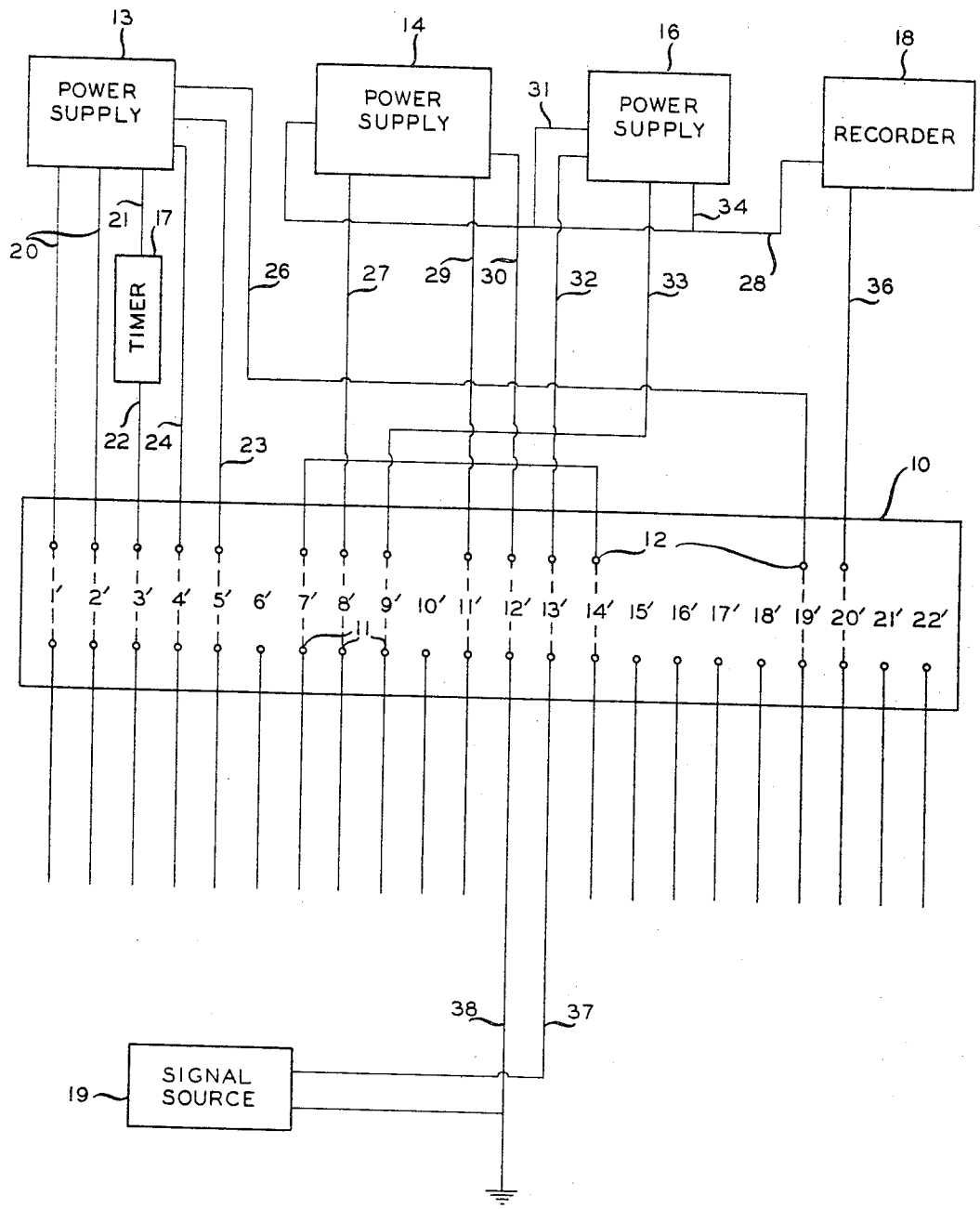
FIGURE 1 is a schematic representation of one embodiment of the portable electrical circuit testing apparatus of my invention.

Referring to the drawings, the invention testing apparatus comprises power supply (illustrated in FIGURE 1 as power supply sources 13, 14 and 16), recorder 18, a timer 17, a signal source 19 and a multiple terminal panel 10. Although three power supply sources are herein illustrated to supply different voltages for the hereinafter described specific example, it is within the scope of this invention to employ a single power supply capable of supplying multiple voltages. Referring to the drawings, the invention will hereinafter be described as applied to the testing of a specific memory circuit.

Figure 2:
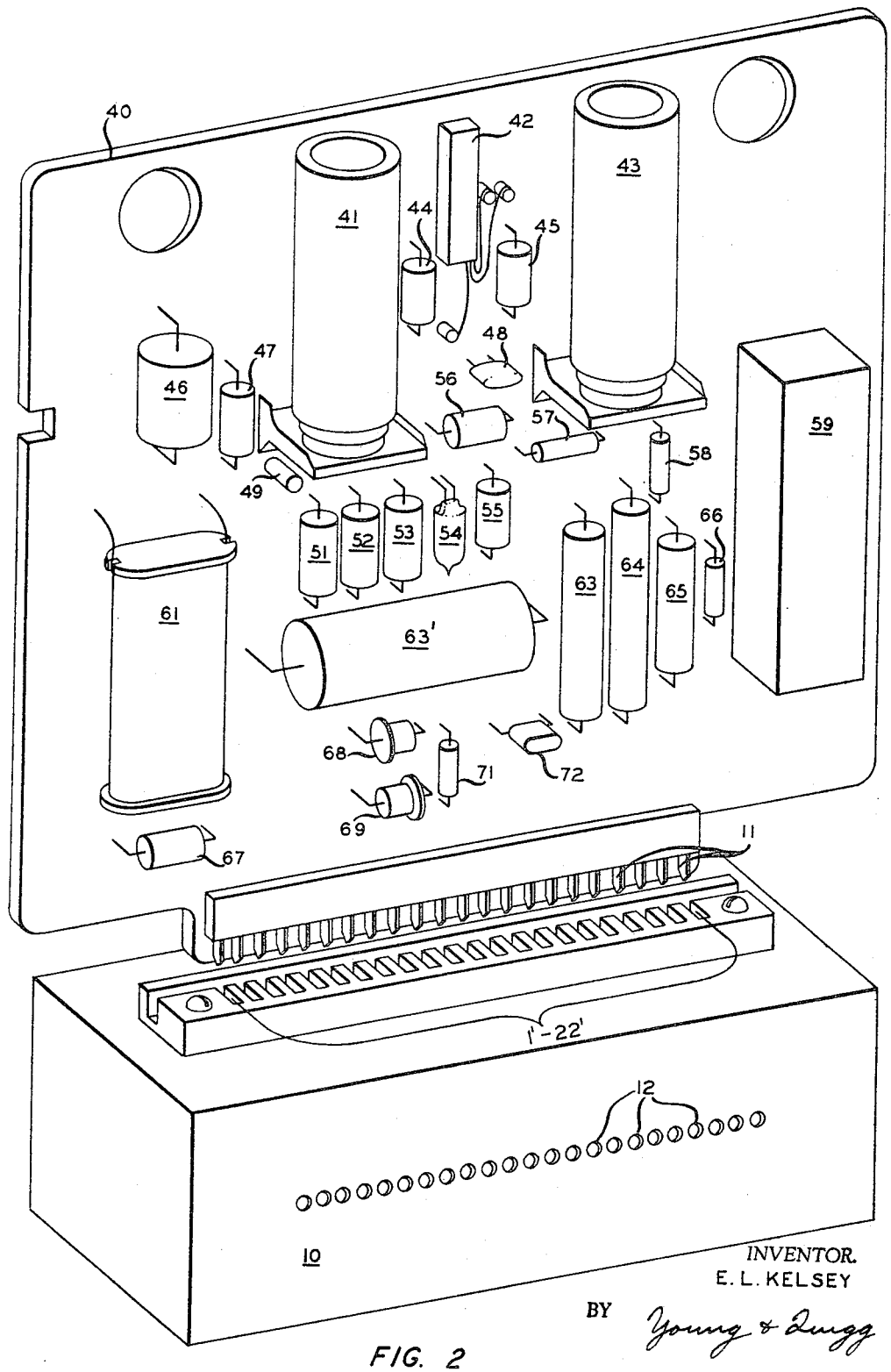
FIGURE 2 illustrates a preferred method for connecting a card containing the electrical circuit to be tested to the inventive electrical testing apparatus.
Figure 3:
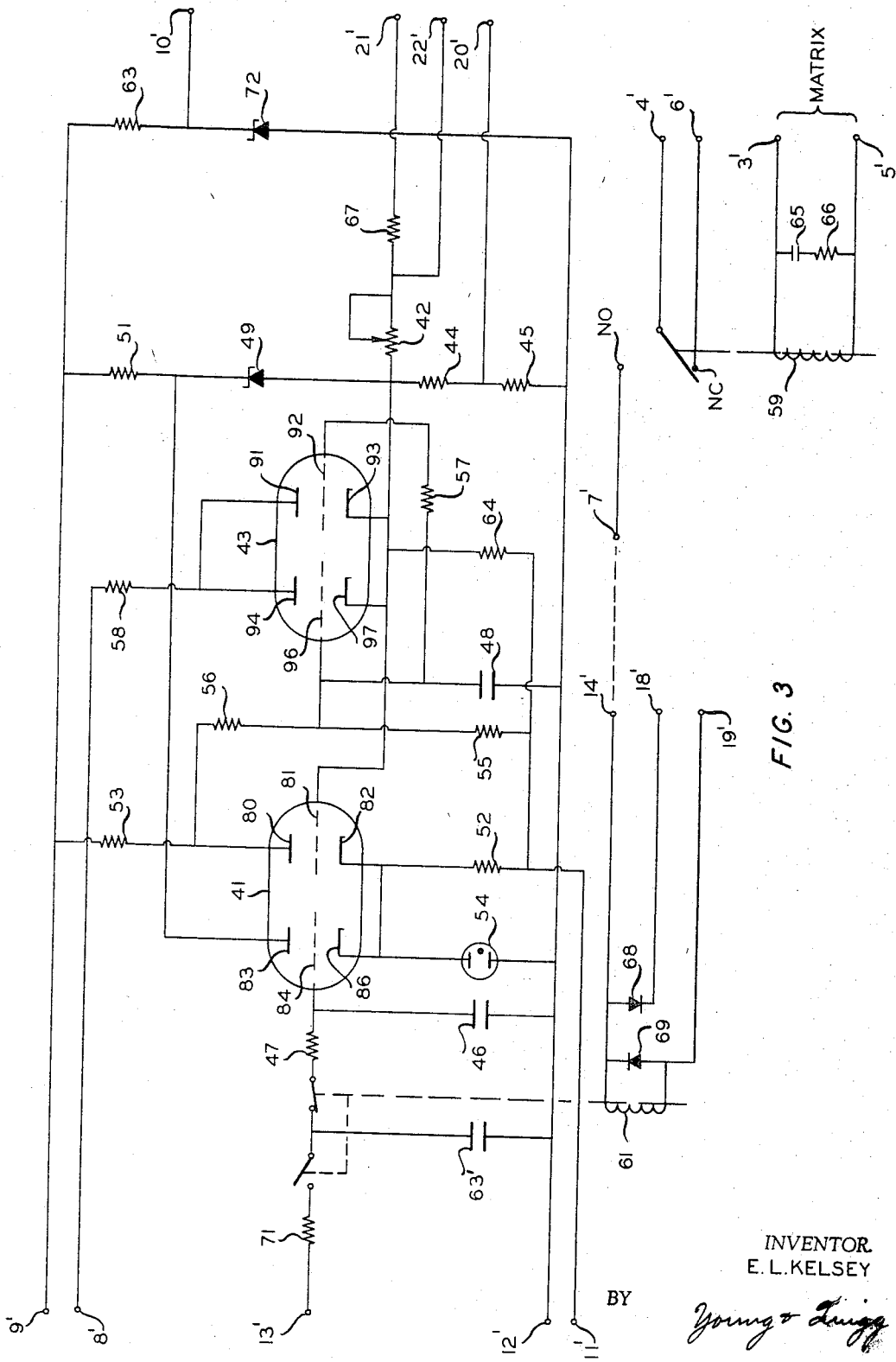
FIGURE 3 is a schematic representation of the DC amplifier circuitry of the card of FIGURE 2.

A 6.3 AC voltage is transmitted from power supply 13 via leads 20 and openings 12 of FIGURE 2 to terminal connectors 1', 2' of multiple terminal panel 10. Terminal connectors 1'–22' comprise female connecting means for connecting power supply 13, 14, 16 and recorder 18 to the memory circuit positioned on card 40 (FIGURE 2) through the corresponding or appropriate male connectors 11. The 6.3 AC voltage is transmitted from terminal connectors 1', 2' to the filament heaters of double triodes 41 and 43.

A 110 DC voltage signal is transmitted from power supply 13 via lead 21 to timer 17. The 110 volt signal is transmitted from timer 17 via lead 22 to terminal connector 3' at a specific interval and for a specific period of time, for example, 1 minute. The 110 volt DC signal is transmitted from terminal connector 3' to a matrix circuit comprising 0.015 µf. condenser 65 and 10 ohm resistor 66 connected in series, and to the coil of relay 59 connected in parallel with condenser 65 and resistor 66. The return of the matrix circuit is connected to the terminal connector 5' and to power supply 13 via lead 23.

A 6 volt DC signal is transmitted from power supply 13 via lead 24 to terminal connector 4' and from terminal connector 4' to switch contacts of relay 59. With relay 59 switch contacts in the normal open position, the 6 volt DC voltage is transmitted to terminal connector 7' and from terminal connector 7' to terminal connector 14'. From terminal contactor 14' the 6 volt DC signal is transmitted to rectifiers 68 and 69 connected to the coil of ralay 61. The return is connected through terminal connector 19' to power supply 13 via lead conduit 26.

A 155 volt DC signal is transmitted from power supply 14 via lead 27 to terminal connector 8' and from terminal connector 8' to the plates 91 and 94 of double triode 43 through 10 ohm resistor 58.

A 310 volt DC signal is transmitted from power supply 16 via lead 33 to terminal connector 9' and from terminal connector 9' to the plate 80 of double triode 41 through 1.5 megohm, 2 watt resistor, 53, and to plate 83 through 330 kilohm, 2 watt resistor 51. Terminal connector 9' is also connected through 50 kilohm, 10 watt resistor 63, and Zener diode 72 to grounded terminal 12'. Zener diode 49 is connected between resistor 51 and the cathodes 93 and 97 of double triode 43. Resistors 56 and 55 are connected between plate 80 and the negative terminal 11' to form a voltage divider with the junction between the two resistors being connected to grid 96 of the first vacuum tube of 43, and through resistor 57 to grid 92 of tube 43. Grid 96 is connected to ground 12' via condenser 48. Cathodes 82 and 86 of double triode 41 are connected together and via resistance 52 to negative terminal 11', and through neon voltage regulator 54 to ground 12'.

A 6 DC volt signal is transmitted from power supply 16 via lead 32 to input terminal connector 13' and from terminal connector 13' through 39 kilohm resistor 71 to 2 microfarad condenser 63' when the first of the two switches operated by relay coil 61 is in the closed position and the second switch is in the opened position. This voltage is transferred from condenser 63' to condenser 46 via resistance 47 and to grid 84 when the first switch is opened and the second switch is closed by operation of relay coil 61. Condensers 63' and 46 are connected to ground via terminal connector 12' and lead 30.

A 50 millivolt signal is transmitted from output terminal connector 20' of panel member 10 via lead 36 to a conventional recorder 18. Three output leads are taken from the cathodes of double triode 43. A negative 50 millivolt signal is obtained over terminal connector 20' which is connected to the junction of a voltage divider circuit made of two resistors 44 and 45, the latter being connected to ground 12'. A negative 50 volt signal can be obtained over terminal connector 21' with the signal passing through variable resistor 42 and fixed resistor 67 when a low impedance recorder is used at 18, or only through variable resistor 42 and terminal connector 22' when a high impedance recorder is used at 18. A positive 10 volts bias may be applied at terminal connector 10' through Zener diode 72 to hold the output signal within the range of 0 to −50 volts at terminal connectors 21' and 22'.

As illustrated, a signal source 19 transmits a signal representative of a process variable input of from zero to 50 volts via leads 37 and 38 to terminals 13' and 12', respectively.

Panel 10 as illustrated thus contains spaced terminal connectors 1' to 22' adapted for transmitting and the receiving of electrical signal pulses to and from, respectively, multiple circuits, said multiple circuits having spaced connecting means corresponding to said terminal connectors 1' to 22'. As illustrated, each of said terminal connectors 1' to 22' are positioned parallel to and in the same plane with the remainder of said terminal connectors, thereby providing for the simultaneous connecting and testing of all the circuits on the card 40. In providing for the simultaneous connecting and testing of the circuits, downtime of the equipment containing the circuits to be tested is reduced to a minimum.

As will be evident to those skilled in the art, various modifications of this invention can be made, or followed, in the light of the foregoing disclosure, without departing from the spirit or scope thereof.

I claim:

1. Apparatus for testing electrical circuit boards provided with a plurality of input terminals and a plurality of output terminals, an amplifier, means for connecting the signal output of said amplifier to said output terminals, a first capacitor continuously connected to the signal input of said amplifier, a second capacitor, relay means for connecting said second capacitor sequentially to one of said input terminals and to said first capacitor; comprising a plurality of terminal connectors positioned to simultaneously receive respective ones of said plurality of input terminals and plurality of output terminals, a plurality of power supplies connected to respective ones of said terminal connectors positioned to receive said input terminals to provide operating voltages for the circuit board being tested, a signal source connected to the one of said terminal connectors which is positioned to receive the one of said input terminals which is connectable to said second capacitor by said relay means, a timer connected between one of said power supplies and one of said terminal connectors to actuate said relay means from a first state to a second state, said relay means in said first state connecting said second capacitor to the respective one of said input terminals and in said second state connecting said second capacitor to said first capacitor.

References Cited

UNITED STATES PATENTS

| | | | |
|---|---|---|---|
| 2,798,199 | 7/1957 | Potter | 324—73 X |
| 3,034,051 | 5/1962 | Higgins | 324—73 |
| 3,143,702 | 8/1964 | Kohler | 324—73 |

RUDOLOPH V. ROLINEC, *Primary Examiner.*

E. L. STOLARUN, *Assistant Examiner.*